Jan. 16, 1940.  F. D. FOWLER  2,187,024
METHOD OF COMPACTING ARTICLES
Filed June 15, 1938
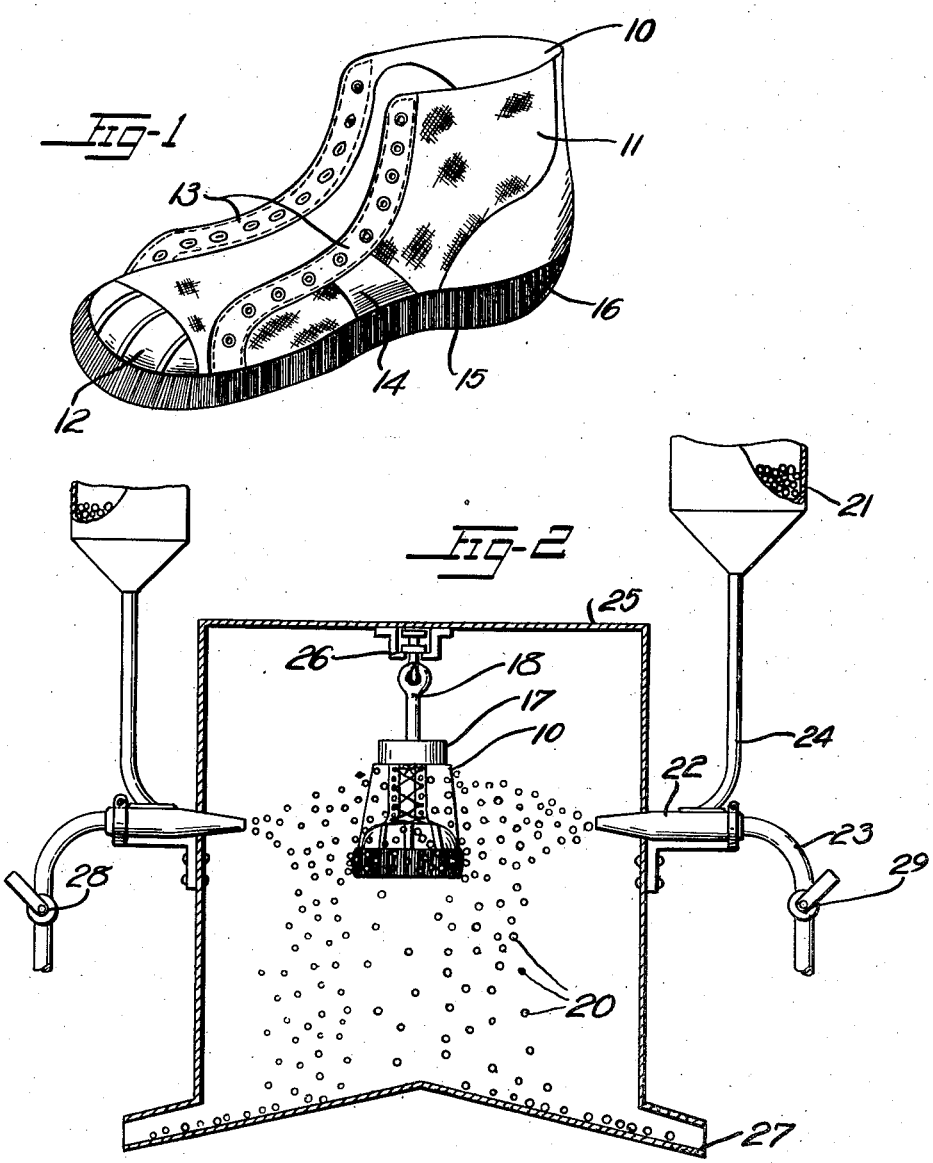
Inventor
Fred D. Fowler
By Willis F. Avery
Atty Patented Jan. 16, 1940

2,187,024

UNITED STATES PATENT OFFICE 2,187,024

METHOD OF COMPACTING ARTICLES

Fred D. Fowler, Newton, Mass., assignor to Hood Rubber Company, Inc., Watertown, Mass., a corporation of Delaware Application June 15, 1938, Serial No. 213,852

2 Claims. (Cl. 154—2)

This invention relates to methods of compacting articles so as to adhere the assembled parts to each other and conform them to shape.

In the manufacture of rubber shoes and many other rubber articles, the parts of the articles are cut from rubber sheet material and rubber covered fabric and are assembled, usually about a last by rolling or pounding with a hand tool. The rolling and pounding have often marked the article undesirably, but is very effective in uniting the rubber parts. This invention aims to secure the parts together without marking the article, and to facilitate stitching or pounding the rubber parts on irregular shapes, to conform them thereto.

The principal objects of the invention are to provide secure bonding of the rubber parts, to facilitate application of the parts to irregular shapes, to eliminate the use of hand tools, to eliminate objectionable marking of the articles, and to facilitate manufacture.

These and other objects will appear from the following description and the accompanying drawing.

Of the drawing:

Fig. 1 is a perspective view of a rubber and fabric shoe, in the manufacture of which the invention has been employed.

Fig. 2 is a cross-sectional view of apparatus for practicing the invention with a shoe therein.

Referring to the drawing, an article such as a shoe 10 is assembled from parts of rubber and rubberized fabric such as the fabric upper 11, rubber toe cap 12, rubber eyelet strip 13, rubber instep reinforcement 14, rubber sole 15, and rubber sole foxing 16. The parts are assembled upon a supporting last 17, which for convenience, may be mounted on a hanger 18.

The invention comprises compacting the shoe or other article of manufacture and bonding its several parts to each other and conforming them to shape by a shower of pellets projected against its outer surface so as to pound the parts into intimate contact with each other. Spherical pellets preferably of hard material such as steel or other hard metal or of glass or stoneware may be used, although softer materials may in some cases be utilized, such for example as rubber or other compositions.

A convenient means of promoting a shower of pellets is by feeding the pellets 20 from a storage bin 21 into a stream of compressed air travelling at a high velocity, for example a nozzle 22 may be connected to a source of compressed air by a hose 23 and the pellets from the reservoir 21 may be fed through a pipe 24 to the nozzle 22 which they enter through a Y-branch. As the pellets enter the air stream they are propelled against the surface of the article 10. While the nozzle 22 may be directed by the hand of the operator, it is desirable to have some means for restraining the pellets and collecting them for reuse.

A convenient apparatus is a cabinet 25 having a track 26 extending therethrough, from which the article 11 may be suspended for travel through the cabinet. A plurality of nozzles 22 may be mounted at strategic positions so as to project their pellets against the articles from different directions. The used pellets drop to the floor of the cabinet when they have lost their velocity and, due to the inclination of the floor of the cabinet, they roll to the outlets 27 where they may be collected and conveyed to the bin 21 for reuse. The forms for supporting the articles may be conveyed through the cabinet by a chain conveyor. Valves 28, 29 in the air lines may be adjusted to control the velocity of the balls.

The pellets used are preferably steel balls. Balls about .17 inch in diameter have given good results, but other sizes either larger or smaller, may be used. However, preferably they should be large enough not to be retained by any apertures or cavities in the surface of the article.

It has been found that substantially no objectionable marking or indentation of the surface of the article occurs, in fact where the rubber has a surface design consisting of ribs as fine as eighty ribs per inch, no noticeable marring of the design occurs.

While the invention is illustrated in one form in which the balls are projected against the article by the use of compressed air, it is contemplated that other mechanical or electrical means could be used to project the balls. These and many other modifications may be made without departing from the invention as it is defined by the following claims.

I claim:

1. The method of compacting an assembled article of flexible material comprising an exposed layer of unvulcanized rubber-like material without injurious marking or scarring of the exposed surface of said layer, said method comprising applying pressure to such layer by a multiplicity of blows directed against the exposed surface of said layer and transmitted through said layer to underlying layers, said blows being effected by bombarding such surface layer with pellets.

2. The method of compacting an assembled article of flexible material comprising an exposed layer of unvulcanized rubber-like material and an underlying adhered layer of flexible material without injurious marking or scarring of the surface of said exposed layer, which method comprises applying pressure to such superimposed adhered layers by a multiplicity of blows directed against the exposed layer and transmitted through said exposed layer to and into the underlying layer, said blows being effected by bombarding said surface layer with pellets projected by fluid pressure.

FRED D. FOWLER.